Figure 1:
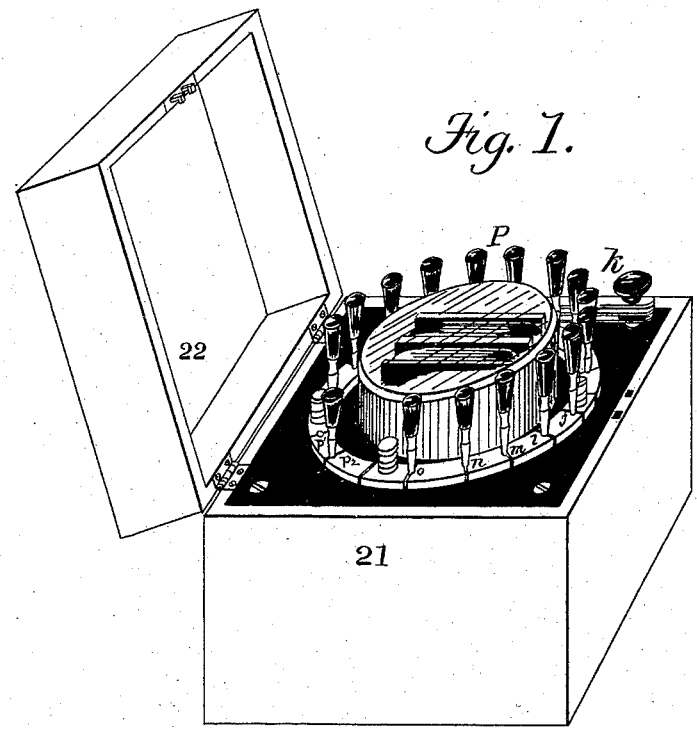

(No Model.) 2 Sheets—Sheet 1.
A. C. WHITE.
ELECTRICAL MEASUREMENT APPARATUS.

No. 401,617. Patented Apr. 16, 1889.

Witnesses. Inventor.

(No Model.) 2 Sheets—Sheet 2.
A. C. WHITE.
ELECTRICAL MEASUREMENT APPARATUS.
No. 401,617. Patented Apr. 16, 1889.
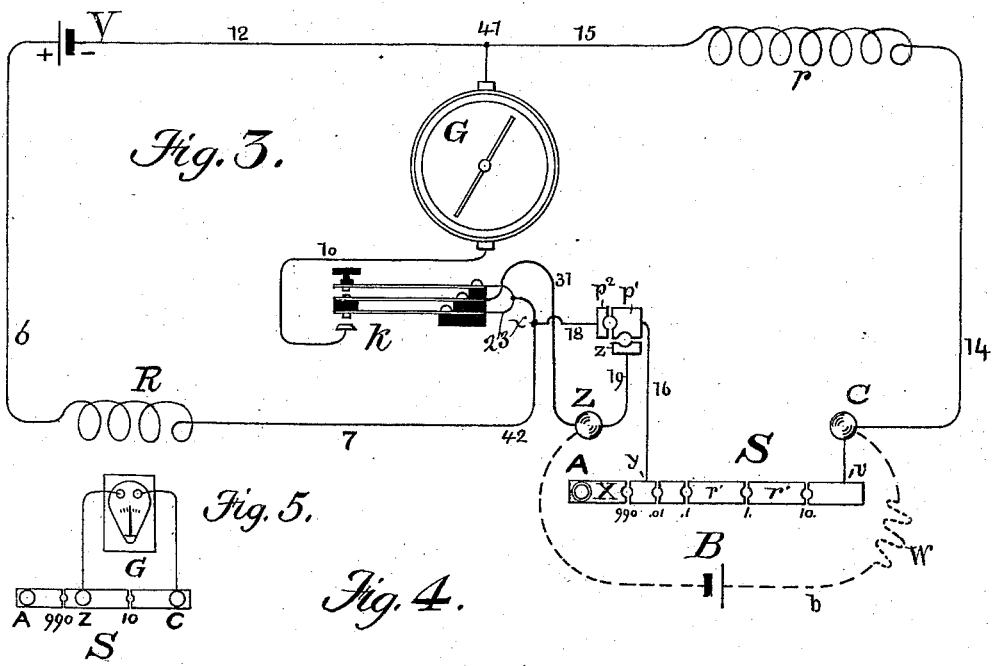
Fig. 3.
Fig. 5.
Fig. 4.
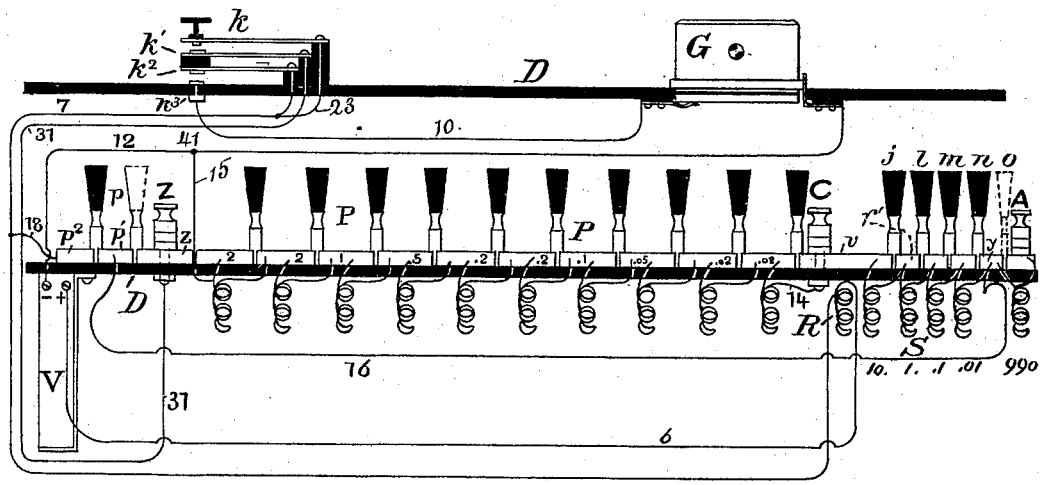
Witnesses.
Gosmilli Pierce
U. M. Bertholdy
Inventor.
Anthony C. White.

UNITED STATES PATENT OFFICE.

ANTHONY C. WHITE, OF BOSTON, MASSACHUSETTS.

ELECTRICAL MEASUREMENT APPARATUS.

SPECIFICATION forming part of Letters Patent No. 401,617, dated April 16, 1889.

Application filed November 21, 1888. Serial No. 291,446. (No model.)

*To all whom it may concern:*

Be it known that I, ANTHONY C. WHITE, residing at Boston, in the county of Suffolk and State of Massachusetts, have invented certain Improvements in Electrical Measurement Apparatus, of which the following is a specification.

In an application for Letters Patent filed by Hammond V. Hayes and myself October 27, 1888, Serial No. 289,351, is described an electrical measurement apparatus in which electro-motive forces may be balanced upon the "Lumsden" or "Lacoine" method, (so called,) and in which the unknown electro-motive force is directly indicated in volts by figures annexed to a plug-plate controlling a variable resistance. In this instrument a standard-battery and a fixed resistance in circuit therewith are combined with a galvanometer, the electrical generator whose electro-motive force is to be tested, an adjustable resistance, and a compound circuit-closing key in such a way that the circuits of both generators and of the galvanometer are normally open, and that the two generator-circuits can be simultaneously closed by the depression of the key, the galvanometer-circuit being also closed an instant later, but by the same motion. The adjustable resistance is directly in circuit with the generator to be tested. When the key is depressed, the currents developed by the standard-battery and by the generator under test are both directed, but in opposition to one another, through the galvanometer-helix. A certain deflection of the needle then appears; but by unplugging and altering the variable resistance the needle may be brought to zero. The adjustable resistance is graduated in such a manner that when the needle is brought to zero the value in volts of the electro-motive force of the generator under test may be read off from the figures annexed to such portion of the said variable resistance as it may be necessary to introduce in order to reduce the deflection of the needle to zero.

The instrument described in the said application includes also the addition of a shunting device, which may be applied to the instrument-terminals which are arranged for the connection of the generator to be tested, the said shunt-circuit being arranged either to be controlled by or to be independent of the key, as may be desired, and by this addition the voltmeter is adapted to give a second reading, from which by a simple calculation the internal resistance of the generator under test may be deduced.

My present invention relates also to measurement apparatus, and is in effect the addition to and combination with the instrument described above, or, in fact, with any direct-reading voltmeter of other elements of simple and uncomplicated character, whereby the same instrument may be utilized also in the measurement of current strength, the result being given in direct terms of ampères, and whereby a second and alternative method of electro-motive-force measurement, enabling the operator to correct the first, if desired, and also materially increasing the range of the instrument, may be made, the current-meter being adapted in the latter case, by the addition of a single coil, for use as a voltmeter. These functions, it is evident, add considerably to the efficiency and value of the instrument, it being especially convenient to employ an instrument which is capable of measuring electro-motive force and resistance as well as current.

My invention specifically consists, first, in providing a known resistance or a series of known resistances which can be connected to the measuring-terminals of a high-resistance voltmeter as a portion of the circuit in which flows the current which is to be measured, and likewise as a shunt of the voltmeter. These are to be so arranged that either an ohm, ten ohms, one-tenth of an ohm, or one-hundreth of an ohm, or more generally any number in the same geometrical progression can be introduced into or withdrawn from the said shunt. For convenience this variable-resistance shunt is preferably made to embody also shunt-resistances which can be and are adapted to be used for other purposes. For example, in the measurement of internal resistance by the voltmeter, to which I have hereinbefore referred, a ten-ohm coil is used in a shunt-circuit. This, therefore, I incorporate on the score of simplification in the same shunt-circuit, it being of course understood that none of the individual resistances are included in the circuit until the plugs controlling them are withdrawn. Moreover, it is obviously not essential that the several shunt-resistances shall be so arranged, and two or more independent shunt-circuits may be constructed, if desired; but in that event each must be open or disconnected while the other is being used, and when none of them are being used all must be open.

This device is well adapted for use in combination with any high-resistance direct-reading voltmeter, and its pinciple may be thus stated: Let a circuit, including a battery or other electrical generator, B, a working-resistance, W, and a comparatively low resistance, S, be connected by two points, one on each side of the small resistance S, with the terminals of a high-resistance voltmeter. Let C be the current flowing in the circuit through W and S, and E the electro-motive force as measured by the voltmeter at the terminals of the smaller resistance, S. If the result in volts be now divided by the resistance S in ohms, I shall obtain the value of the current in ampères, for if the difference of potential at the two ends of a fixed resistance be ascertained, and, if the fixed resistance be already known, it is clear from Ohm's law $$C = \frac{E}{S}.$$

Now, if the voltmeter is a direct-reading instrument and S is made equal to unity or to unity multiplied or divided by ten, one hundred, one thousand, &c., C will be given directly in ampères where $S = 1$, and it will only be necessary to move the decimal point to the right or to the left in the case of other values of S.

To use the current-meter as a voltmeter for electro-motive forces of considerable range, the second part of my invention comes into operation. For this purpose I provide an additional and comparatively high resistance external to and independent of the proportional shunt-resistances proper, (but adapted to be used in conjunction therewith,) and a screw-terminal for the attachment of wires, the said resistance, like the others, being controlled by a circuit-changing plug. The principle of this part of the invention may be thus stated: I substitute for the working-resistance a fixed high resistance, an electrical generator, B, whose electro-motive force I desire to measure, (the internal resistance thereof being so small as to be ignored,) and a much smaller resistance, S. I may call the required electro-motive force E, and I know, of course, that E will equal the current C, which it develops when short-circuited through the resistances X and S, multiplied by the said resistances—in other words, (1) $E = C \times (X+S)$. Measuring the difference of potential at the terminals of S by the voltmeter I get a definite result, which I may call $E^2$. Then $E^2 = CS$, and $C = \frac{E^2}{S}$; i. e, I measure in the manner hereinbefore indicated the current flowing through the two resistances X and S, and knowing this value C, I can readily obtain E from equation (1.) For example, I make X equal nine hundred and ninety ohms and S equal ten ohms. I find the reading of the voltmeter to be 1.05. C in that case would be .105 and E the electro-motive force required would be $(990+10) \times .105$ or one hundred and five volts.

The numbers here stated are by no means arbitrary, it being only necessary that the sum of the values of the high resistance and one of the lower resistances already provided in the ammeter-shunt, taken together, shall be ten, or some number multiplied by ten; and for magnitudes of one hundred volts, or thereabout, it is particularly convenient to provide that the sum of the two resistances shall be one thousand ohms. This can of course be made up by causing the larger resistance to be nine hundred and ninety-nine and the smaller unity; but the former condition of nine hundred and ninety and ten is preferable, because simpler.

Figure 2:
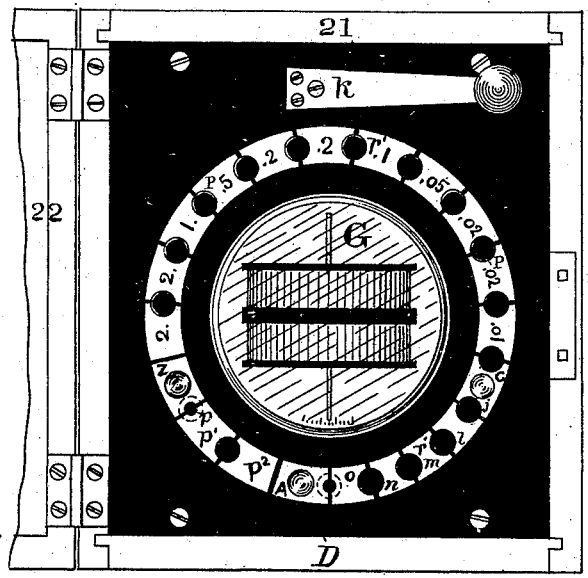

In the drawings illustrating and forming a part of this specification, Figure 1 is a perspective view of the complete instrument as organized, mounted compactly in a suitable box. Fig. 2 is a plan view of the visible parts thereof, which are adapted for manipulation. Fig. 3 is a theoretical diagram of the connections. Fig. 4 is a diagram of the same circuits, but more accurately representing the actual arrangement; and Fig. 5 is a diagram indicating the application of the instrument to any direct-reading voltmeter, and indicating also the use of a suitable fixed instead of an adjustable resistance in the shunt.

Letters or figures of reference are scarcely required in describing Figs. 1 and 2, since in these figures the major part of the apparatus is within the box and concealed.

The apparatus is mounted in a box, 21, having a lid or cover, 22, which can be closed and locked, so as to make a portable appliance. The working parts are attached to both sides of a non-conducting base-board, D, screwed to the box. On the upper surface of the base-board, as shown, is the galvanometer G of the volt and ammeter, surrounded by the graduated short-circuiting plates $r'$ of an inclosed adjustable resistance, $r$, and the connecting-plugs P and $p$. The plugs P control the adjustable resistance proper, that designated $p$ the circuit-changer, and those marked $j$, $l$, $m$, $n$, and $o$ the resistance of the shunt or shunts. A compound circuit closing and opening key $k$ is also mounted on the base D. On one side of the circle of graduated plates are three screw-terminals intended for the attachment of the battery, circuit, or other appliance which is to be tested. Two of these are distinguished, respectively, by the letters Z and C, indicating in the case of an electric generator the order of attachment of the respective poles thereof. The third and intermediate terminal is marked A, and is for use instead of Z in making electro-motive-force tests by the ammeter method. Between the terminals Z and A are two plates, $p'$ and $p^2$, which, together with their plug $p$, (which may alternatively be placed in either hole,) constitute a circuit-changer, whereby the several shunt-resistances may be connected with the instrument through the key or otherwise, or disconnected therefrom, as may be desired.

Between the terminals A and C are four plates, $r'$, which, with their plugs—one for each hole—control the introduction or withdrawal into use of certain shunt-resistances which are employed in the measurement of resistance, current, and electro-motive force when measured by the current method. The terminals A and Z themselves are mounted on plates which can be plugged to adjacent plates on one of their sides, while C is mounted on a plate connected by plugs on both sides to the remainder of the system.

Within the box B and upon the under side of the partition D are collected a standard battery, a fixed resistance therefor, the adjustable resistance connected with and controlled by the plates $r'$ and plugs P, a series of resistances in the shunt circuit or circuits, and the necessary circuit-connections.

Referring to Figs. 3 and 4, G is the galvanometer; V, a standard battery; R, a fixed resistance; $r$, a variable resistance, and $k$ the controlling-key. In Fig. 3 alone a battery, B, and a circuit, $b$, are shown under test. The actual arrangement in Fig. 4 in other respects closely copies the theoretical arrangement of Fig. 3. It is not necessary to fully describe the construction and operation of the main part of the apparatus, since the present invention relates exclusively to the construction of a shunt-circuit appendage and to its combination with the voltmeter, and since, moreover, the voltmeter shown and its mode of operation is fully described in a pending application to which I have already referred. It must, furthermore, be fully understood that the shunt appendage and its construction in which is embodied my invention are adapted for application to any direct-reading voltmeter, and that the voltmeter to which it is applied, as herein shown and described, is specifically referred to in this specification for the reason only that I have in practice applied it to this form of apparatus, and have therewith determined its efficiency. It is sufficient, therefore, in addition to what has already been stated in the declaration of invention to state that in the special form of voltmeter shown the electro-motive force to be tested is connected with terminals C and Z, and is thereby brought into serial circuit with the standard battery V, the fixed resistance R, the adjustable resistance $r$, and one of the key-contacts, the circuit still being open at the said contact, and the batteries so connected as to re-enforce one another. The galvanometer G is placed in a bridge-circuit across the circuit from a point, 41, between the standard battery V and the adjustable resistance $r$ on one side to a point, 42, between the battery under test, B, and the fixed resistance R on the other, but is likewise in open circuit, because it also passes through one of the key-contacts. The depression of the key $k$ closes the circuits and directs the currents of the two batteries through the galvanometer in opposite directions, and one current being the stronger produces a deflection. The adjustable resistance is then varied by withdrawing and changing plugs until the needle returns to zero, when it is evident that the currents must be equal. The adjustable resistance is so calibrated and graduated that when the needle is at zero the figures opposite the unplugged resistance indicate in volts and fractions thereof the electro-motive force of the generator under test.

The circuit of the standard battery V, beginning at the positive pole, is traced as follows: by wire 6 to fixed resistance R, thence by wire 7, lower conducting-strip of key $k$, and wire 10 to the galvanometer G, and thence back to the other pole of the battery by wire 12. The circuit of the generator B from terminal C is by wire 14, variable resistance $r$, and wire 15 to point 41, thence through the galvanometer in the opposite direction to the current from battery V, thence by wire 10, anvil-contact of key $k$, lower conducting-strip of said key, upper strip of same, (by short connecting-wire 23,) middle strip of said key, and wire 31 to terminal Z. The voltmeter proper terminates at the binding-screws Z and C.

In the theoretical diagram I provide a shunt, S, comprising resistances arranged in geometrical progression, with ten for their ratio or constant multiplier or divisor, so that they consist, respectively, of the values of ten ohms, one ohm, one-tenth of an ohm, and one-hundredth of an ohm, or, of course, reversely, these being normally short-circuited by plugs $j$, $l$, $m$, and $n$ and plates $r'$. If desired, further progress, using the same ratio, may be made in either direction; but the range which I have stated is sufficient to illustrate the principle of operation and for most practical purposes. This shunt-circuit S, I connect by the wire $v$ to one terminal—say C—of the voltmeter, and by the wire 16 and plate $y$ or equivalent connections to the other terminal, Z, of the voltmeter. For convenience I run this latter connection through a plug circuit-changer, so that in the diagram the wire 16 connects plate $y$ with the main plate $p'$ of said circuit-changer. When the plug is inserted in the hole between the said plate and $p^2$, the shunt-circuit is led thereby and by wire 18 through the key-contact, and then by wire 31 to the Z terminal, while when the plug is placed in the hole between the said plate and $z$ the circuit leads to the Z terminal direct. This arrangement is most convenient when the instrument is applied to the particular voltmeter herein shown, it forming a part thereof for other purposes; but when the attachment is used in connection with other voltmeters $y$ and $v$ may be in operation brought directly into connection with the voltmeter-terminals Z and C. In the latter case it would be advisable to add an infinity plug to the shunt, so that the said shunt, though mechanically attached to the voltmeter-terminals, might be kept open by the withdrawal of said plug until the time for operation arrived.

The instrument is adapted for use as a voltmeter for high electro-motive forces by the addition, as shown, of an extra and high resistance coil, X, and a screw-terminal, A. Therefore I have shown short-circuiting plates and a plug, o, for this coil; but these may, if desired, be dispensed with, as the coil must of necessity be introduced. This coil is of known resistance, and is conveniently made nine hundred and ninety ohms, so that when taken with the largest or ten-ohm coil of the ammeter-shunt system it makes one thousand, a number in the same geometrical progression, and a convenient number as a basis of calculation. For extremely large electro-motive forces a coil of nine thousand nine hundred and ninety ohms would be substituted, and, if desired, both coils might be incorporated in the apparatus, that which is unused being short-circuited in the usual way by terminal plates united by a plug. It is, indeed, evident that any two numbers, as hereinbefore stated, of which the sum is ten or a larger number in geometrical series therewith, having ten for its ratio, will answer for this purpose; but it will always be found convenient to adopt as the smaller resistances one of those in the ammeter attachment, so that in practice the larger resistance will be regulated by these. This part of the apparatus is out of operation during the measurement of currents; but if a high electro-motive force is to be measured the generator whose electro-motive force is to be tested is not connected with terminals Z and C but with A and C. The high-resistance coil when unplugged then forms part of the circuit and serves as a shunt of the actual voltmeter-circuit, which, as before, leads from the terminal C through the voltmeter to the opposite terminal, Z, and thence back by way of the connecting-wire to the point y and through the shunt-circuit again to C.

In the diagram, Fig. 4, the four coils of the adjustable shunt-resistance and the nine-hundred-and-ninety-ohm coil, with their short-circuiting plugs j, l, m, n, and o, are shown at the extreme right. The plate v is seen to form the connection between terminal C and the first coil, while from the plate y between the one-hundredth-of-an-ohm coil and the nine-hundred-and-ninety-ohm coil the wire 16 extends to the plate p' at the other side of the figure, forming the connection through the circuit-changer with the terminal Z.

I will now specify briefly the mode of operation of the two parts of the invention.

It is desired to measure a given current. The circuit conducting the same is opened and the two terminals thereof connected with C and Z, as in Fig. 3, where the two ends of a circuit, b, traversed by a current which is generated by a source, B, and including any given work, W, are so shown.

The general character of the current is usually known roughly. For small currents—say for strengths of from .001 to .1 ampères—the plug j is taken out and ten ohms thereby introduced into circuit. A reading of the voltmeter is then taken and the decimal point of the said reading moved one place to the left. The reading then indicates exactly the current strength in ampères. The circuits in this operation will be readily traced on Fig. 4. The circuit of standard battery V is as before described. That of the generator under test is from terminal C by wire 14, variable resistance r, wire 15, galvanometer G, wire 10, anvil-contact $k^3$, conducting-strip $k^2$, wire 23, strip k, strip k', and wire 31 to terminal Z. From terminal C the shunt-circuit is by plate v through the ten-ohm resistance (plug j being removed) through the several contact-plates of shunt S and the connecting-plugs l m n to plate y, and thence by wire 16, plate p', and plug p to plate z, which is connected directly with terminal Z. For currents of from .01 to 1. ampères we take out plug l, which introduces exactly one ohm. Taking the reading of the voltmeter I may adopt the same without change, for, supposing the reading is two volts, this of course is the difference of potential between the two fixed points C and Z, and I know absolutely that the resistance between those points is one ohm; and I know that the current is the quotient of the electro-motive force divided by the resistance. The quotient in this case of the electro-motive force, as indicated by the reading 2 when divided by the resistance unity must necessarily be the same and the current strength in ampères is also 2. The only change made in the circuits is in shunt S, the ten-ohm resistance being short-circuited by its plug j and the one-ohm coil being included instead. So, also, for currents of from .1 to ten ampères I may withdraw plug m, introducing 0.1 ohm, and for the result, after obtaining the reading, move the decimal point one place to the right. While for extremely large currents of from ten to one hundred ampères I remove plug n, introducing 0.01 of an ohm, and after obtaining the reading move the decimal point two places to the right.

If it is desired to measure electro-motive forces of from one volt to two hundred volts, I connect the wires of the generator with the terminals C and A and remove plug o, introducing nine hundred and ninety ohms, and plug j, introducing ten ohms, thus making up one thousand ohms. I take the reading of the voltmeter, as before, and move the decimal point of the said reading two places to the right. The final result will directly state the electro-motive force in volts. By this manipulation the direct circuit of the generator under test proceeds as before from terminal C to terminal Z, thence it continues by plate $z$, plug P, plate P', and wire 16 to the plate $y$ of the shunt S, and thence (plug $o$ being withdrawn) through the large resistance (nine hundred and ninety ohms) to terminal A. The circuit of the shunt is traced from C through the ten-ohm coil (plug $j$ being withdrawn) to plate $r'$, and thence through the several plates and their plugs $l$ $m$ $n$ to plate $y$, and through the large resistance to terminal A.

If higher voltage is desired to be measured, (say from ten to one thousand volts,) this can be done by adding another coil of nine thousand nine hundred and ninety ohms resistance, by introducing this instead of the lower one, and after taking the reading by moving the decimal point two places to the right. The theory of the latter feature I have herein fully explained in the statement of the invention, and it will be seen that by this device high electro-motive forces can be measured by voltmeters which otherwise are adapted for the measurement of low electro-motive forces only.

I desire to state, also, that since it may frequently happen that an ammeter may be required invariably to measure currents of about uniform strength, I may, without departing from the spirit of my invention, arrange my ammeter-shunt with but a single coil, having but one of the resistances which I have specified. For example, I may provide a shunt in which the only resistance is unity, and in that case the reading in volts will invariably also indicate directly the current in ampères, and if any other coil in the said geometrical progression be chosen as the only coil the result would of course be reached as hereinbefore described. I have shown this in Fig. 5, in which a current-measuring attachment, S, is connected with a direct-reading voltmeter, G.

Having now fully described my invention, I claim—

1. An ammeter consisting of the combination, in a single instrument, of a direct-reading voltmeter and an adjustable shunt therefor having a series of resistances arranged in geometrical progression in the ratio of ten, and provided with circuit-changers for introducing any of the said resistances into circuit at will, the said shunt being connected or adapted to be connected across the voltmeter-terminals, whereby the reading of the voltmeter may be caused to indicate also the current strength in ampères, substantially as hereinbefore described.

2. The combination, in an electrical measurement apparatus, of a direct-reading voltmeter consisting of a test-circuit, a galvanometer in a bridge thereof dividing the said circuit into two divisions, a standard battery and fixed resistance in one division, and in the other a variable resistance, and terminals for connection of a generator or circuit to be tested in such manner that its current will pass through the galvanometer in a direction opposing that of the standard battery, and means for closing the circuit of both generator and galvanometer when a test is to be made, with an adjustable shunt connecting the said terminals of the generator or circuit to be tested and containing a series of resistances, either of which may at will be introduced, the said resistances being, respectively, unity and values in decreasing and increasing geometrical progression therefrom in the ratio of ten, whereby the reading of the voltmeter may be caused to indicate also the strength of current, substantially as herein specified.

3. The combination, substantially as hereinbefore described, of a direct-acting voltmeter adapted for the measurement of low electro-motive forces, an ammeter attachment therefor, whereby the readings of the voltmeter may be caused to indicate the value of the current strength also in direct terms, the said ammeter attachment comprising a resistance or series of resistances with a value of unity, or unity multiplied or divided by ten or powers of ten, shunting the said voltmeter, and a supplementary voltmeter attachment formed, as described herein, and connected with the ammeter, whereby high and low electro-motive forces may be measured with the same instrument.

4. In an electrical measurement apparatus, the combination of two independent resistances in series with one another, one of which is small and the other comparatively great, and the sum of which shall equal ten or some larger number in geometrical series therewith having ten for its ratio, and terminals for the attachment of a generator or appliance to be tested, with a direct-reading voltmeter looped round the smaller resistance, substantially as described.

5. In an electrical measurement apparatus, the combination of a direct-reading voltmeter, an adjustable shunt therefor containing a series of resistances in geometrical progression with the number ten for a ratio, an additional circuit-terminal electrically connected with the said shunt-circuit, and a high resistance included between the said shunt and the said extra terminal, the said high resistance having such a value that when added to a determined one of the shunt-resistances the sum shall be one thousand ohms, or a greater or less number in the same geometrical progression and having the same ratio.

In testimony whereof I have signed my name to this specification, in the presence of two subscribing witnesses, this 16th day of November, 1888.

ANTHONY C. WHITE.

Witnesses:
GEO. WILLIS PIERCE,
FRANK C. LOCKWOOD.